(12) United States Patent
Fukano et al.

(10) Patent No.: US 8,708,131 B2
(45) Date of Patent: Apr. 29, 2014

(54) STOPPER CYLINDER

(71) Applicant: SMC Kabushiki Kaisha, Chiyoda-ku (JP)

(72) Inventors: Yoshihiro Fukano, Moriya (JP); Shoichi Makado, Moriya (JP); Masaki Miyahara, Moriya (JP)

(73) Assignee: SMC Kabushiki Kaisha, Chiyoda-ku (JP)

( * ) Notice: Subject to any disclaimer, the term of this patent is extended or adjusted under 35 U.S.C. 154(b) by 0 days.

(21) Appl. No.: 13/720,234

(22) Filed: Dec. 19, 2012

(65) Prior Publication Data

US 2013/0264172 A1 Oct. 10, 2013

(30) Foreign Application Priority Data

Apr. 5, 2012 (JP) .................................. 2012-086731

(51) Int. Cl.
*B65G 13/075* (2006.01)
*B65G 47/88* (2006.01)

(52) U.S. Cl.
CPC .......... *B65G 13/075* (2013.01); *B65G 47/8815* (2013.01); *B65G 47/8823* (2013.01); *B65G 2205/06* (2013.01)
USPC .................... 198/345.1; 193/35 A; 198/459.6

(58) Field of Classification Search
USPC ............ 198/345.1–345.3, 459.6–459.7, 782; 193/35 A
See application file for complete search history.

(56) References Cited

U.S. PATENT DOCUMENTS

| | | | | |
|---|---|---|---|---|
| 5,211,276 A | * | 5/1993 | Clopton | 198/345.3 |
| 6,164,430 A | * | 12/2000 | Nishimura | 198/345.1 |
| 7,484,615 B2 | | 2/2009 | Miyamoto | |
| 7,565,960 B2 | * | 7/2009 | Worner et al. | 198/459.6 |
| 8,376,122 B2 | * | 2/2013 | Matsumoto | 198/463.4 |
| 2009/0159393 A1 | * | 6/2009 | Lindemann et al. | 193/35 A |

FOREIGN PATENT DOCUMENTS

JP 2008-1452 1/2008

* cited by examiner

*Primary Examiner* — Mark A Deuble
(74) *Attorney, Agent, or Firm* — Oblon, Spivak, McClelland, Maier & Neustadt, L.L.P.

(57) ABSTRACT

A stopper cylinder is equipped with a body having a drive unit, a piston mechanism being displaceable along an axial direction in the interior of a tube connected to the body, and a stopper lever connected to the piston mechanism for stopping conveyance of a workpiece. Displacement of the piston mechanism is restricted by an electromagnetic lock mechanism, which is disposed on the body and is excited by supply of electric power. After approaching the workpiece, by releasing a locked state of the electromagnetic lock mechanism, the piston mechanism is displaced to a position facing the workpiece by an elastic force of a spring.

9 Claims, 10 Drawing Sheets

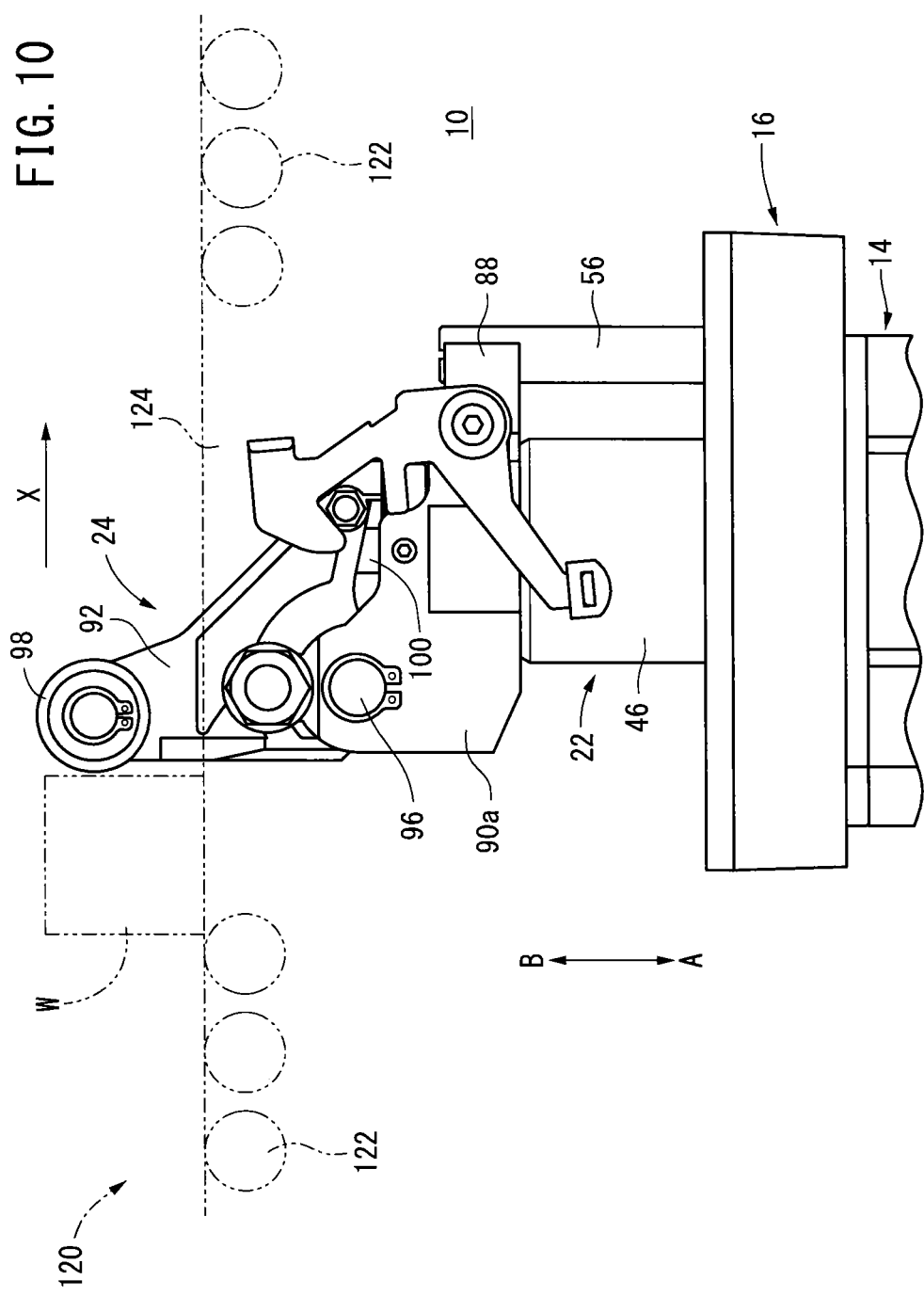

STOPPER CYLINDER

CROSS-REFERENCE TO RELATED APPLICATION

This application is based upon and claims the benefit of priority from Japanese Patent Application No. 2012-086731 filed on Apr. 5, 2012, the contents of which are incorporated herein by reference.

BACKGROUND OF THE INVENTION

1. Field of the Invention

The present invention relates to a stopper cylinder which, through a lock mechanism, is capable of stopping a transported workpiece and positioning the workpiece at a predetermined position.

2. Description of the Related Art

The present applicant, as disclosed in Japanese Laid-Open Patent Publication No. 2008-001452, has proposed a stopper cylinder that stops a workpiece, which is transported by a conveyor line having a plurality of parallel-arranged roller conveyors, at a predetermined position. The stopper cylinder includes a piston rod that is advanced and retracted in a straight line, and a lever member that engages with a forward end of the piston rod. In addition, the lever member projects from a gap between adjacent roller conveyors on the conveyor line for a predetermined length in an upward direction from the conveyor plane. The lever member functions as a stopper such that, by abutment of a transported object against a guide roller provided on the lever member, the transported object is stopped.

SUMMARY OF THE INVENTION

A general object of the present invention is to provide a stopper cylinder, which can arbitrarily set a displacement amount thereof in the axial direction, and which is capable of reliably stopping a workpiece upon suspension of electric power.

The present invention is characterized by a stopper cylinder for stopping a workpiece at a predetermined position by bringing the workpiece, which is transported in a predetermined direction, into abutment against a roller, and by maintaining a lever on which the roller is axially supported at a predetermined position. The stopper cylinder comprises a body, a piston mechanism provided in an interior of the body and disposed for displacement along an axial direction of the body, the lever disposed rotatably on an end of the piston mechanism, a biasing member for urging the piston mechanism in the axial direction, and a lock mechanism disposed on the body, which restricts displacement of the piston mechanism along the axial direction upon supply of electric power to the lock mechanism. Upon suspension of electric power to the lock mechanism, a displacement restricted state of the piston mechanism by the lock mechanism is released, whereby the piston mechanism is displaced a predetermined direction along the axial direction under an urging action of the biasing member.

According to the present invention, in the event that supply of power to the lock mechanism, which restricts displacement of the piston mechanism in the axial direction, is interrupted, the displacement restricted state of the piston mechanism is released, whereby the piston mechanism can be displaced in a predetermined direction along the axial direction due to an urging action of the biasing member. As a result, for example, in the case that the stopper cylinder is used to stop a transported workpiece, even at times that power is suspended, transportation of the workpiece can reliably be stopped by the lever, which is provided on the end of the piston mechanism.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 10 is an enlarged side view showing the vicinity of a stopper lever in the stopper cylinder of FIG. 9.

DESCRIPTION OF THE PREFERRED EMBODIMENTS

Figure 1:
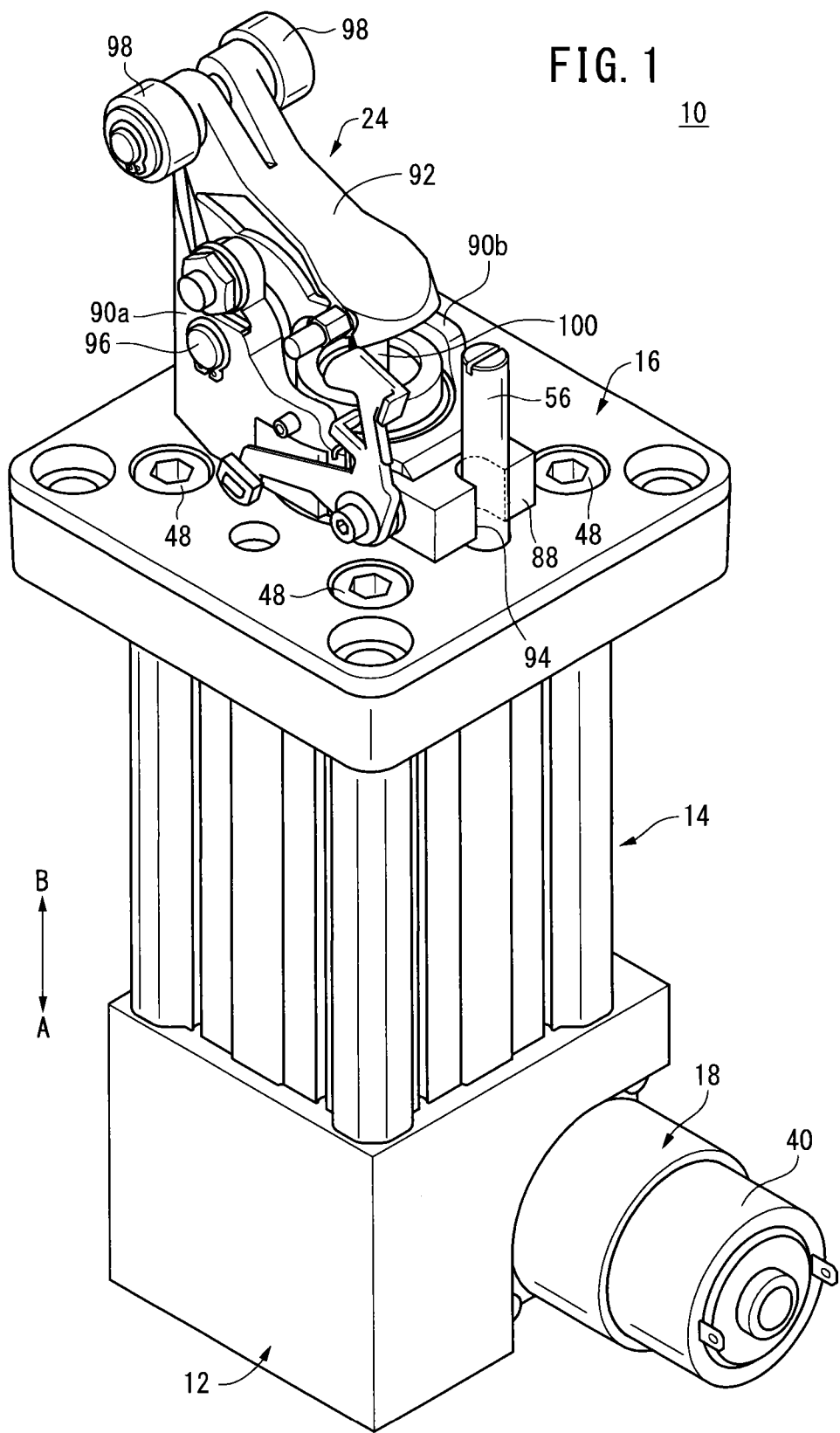
FIG. 1 is an exterior perspective view of a stopper cylinder according to an embodiment of the present invention.
Figure 2:
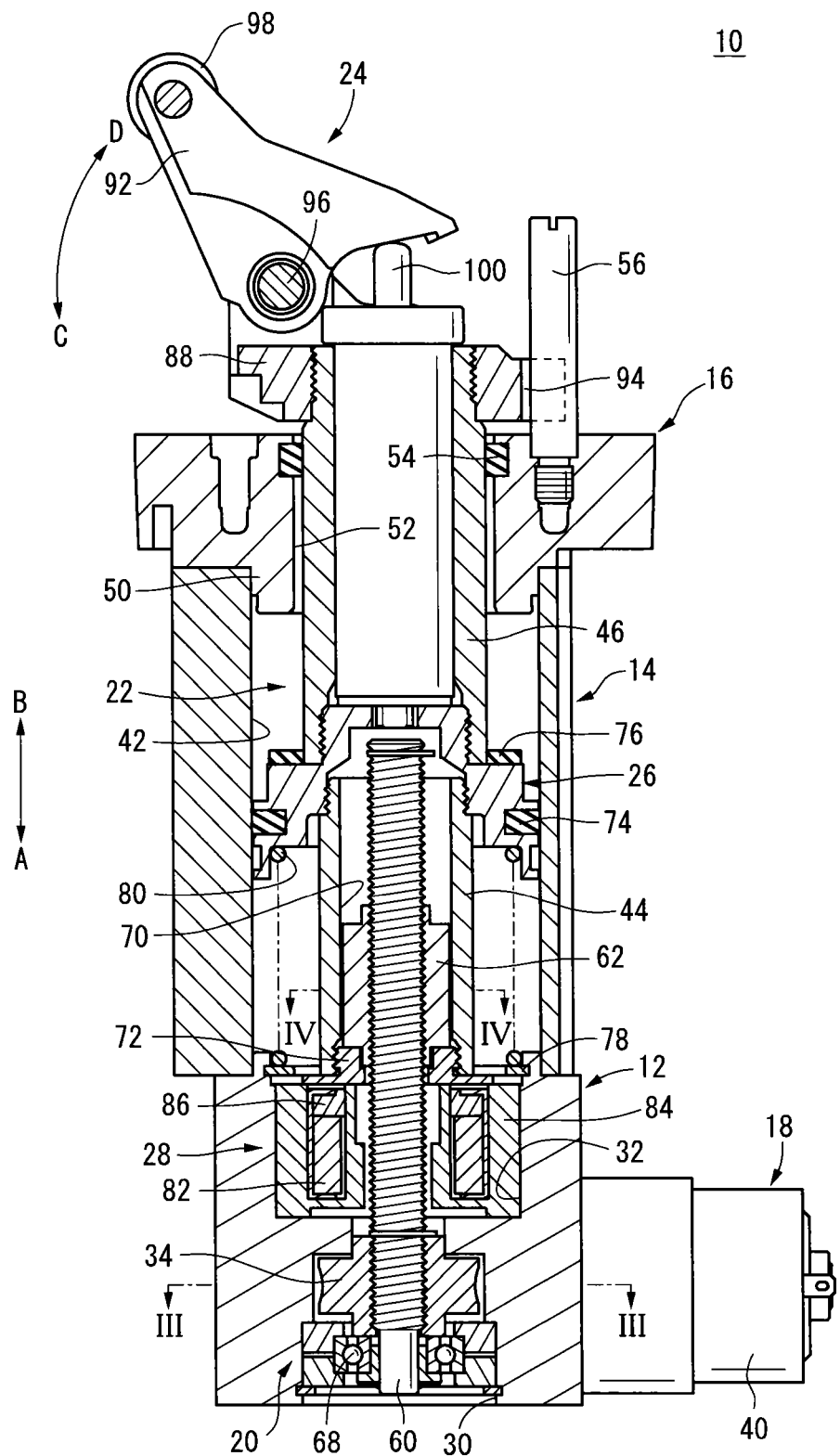
FIG. 2 is an overall cross sectional view showing the stopper cylinder of FIG. 1.

As shown in FIGS. 1 and 2, a stopper cylinder 10 includes a body 12, a cylindrical tube (body) 14 connected to an upper part of the body 12, an end cover 16 that blocks an upper end of the tube 14, a drive unit 18 connected to the body 12, and a drive force transmission mechanism 20 that transmits a driving force from the drive unit 18. Further, the stopper cylinder 10 includes a piston mechanism 22 disposed in the interior of the tube 14 for reciprocal displacement along an axial direction (the direction of arrows A and B), a stopper lever (lever) 24 connected to the piston mechanism 22 for stopping conveyance of a workpiece W, and an electromagnetic lock mechanism (lock mechanism) 28 for restricting upward movement (i.e., in the direction of the arrow B, in a predetermined direction) of a piston 26 that makes up the drive force transmission mechanism 20.

The body 12, for example, is made up from a block body formed from a metal material. First and second accommodating holes 30, 32 are provided in the interior of the body 12 which penetrate through the body 12 in a vertical direction (the direction of arrows A and B).

The first accommodating hole 30 opens in a downward direction (the direction of the arrow A) of the body 12, and a worm wheel 34, which makes up part of the drive force transmission mechanism 20, is disposed rotatably in the interior of the first accommodating hole 30. On the other hand, the second accommodating hole 32 opens in an upward direction (the direction of the arrow B) coaxially with the first accommodating hole 30, and a later-described electromagnetic lock mechanism 28 is disposed in the interior of the second accommodating hole 32. The first and second accommodating holes 30, 32 are formed with substantially circular shapes in cross section (see FIG. 3).

Figure 3:
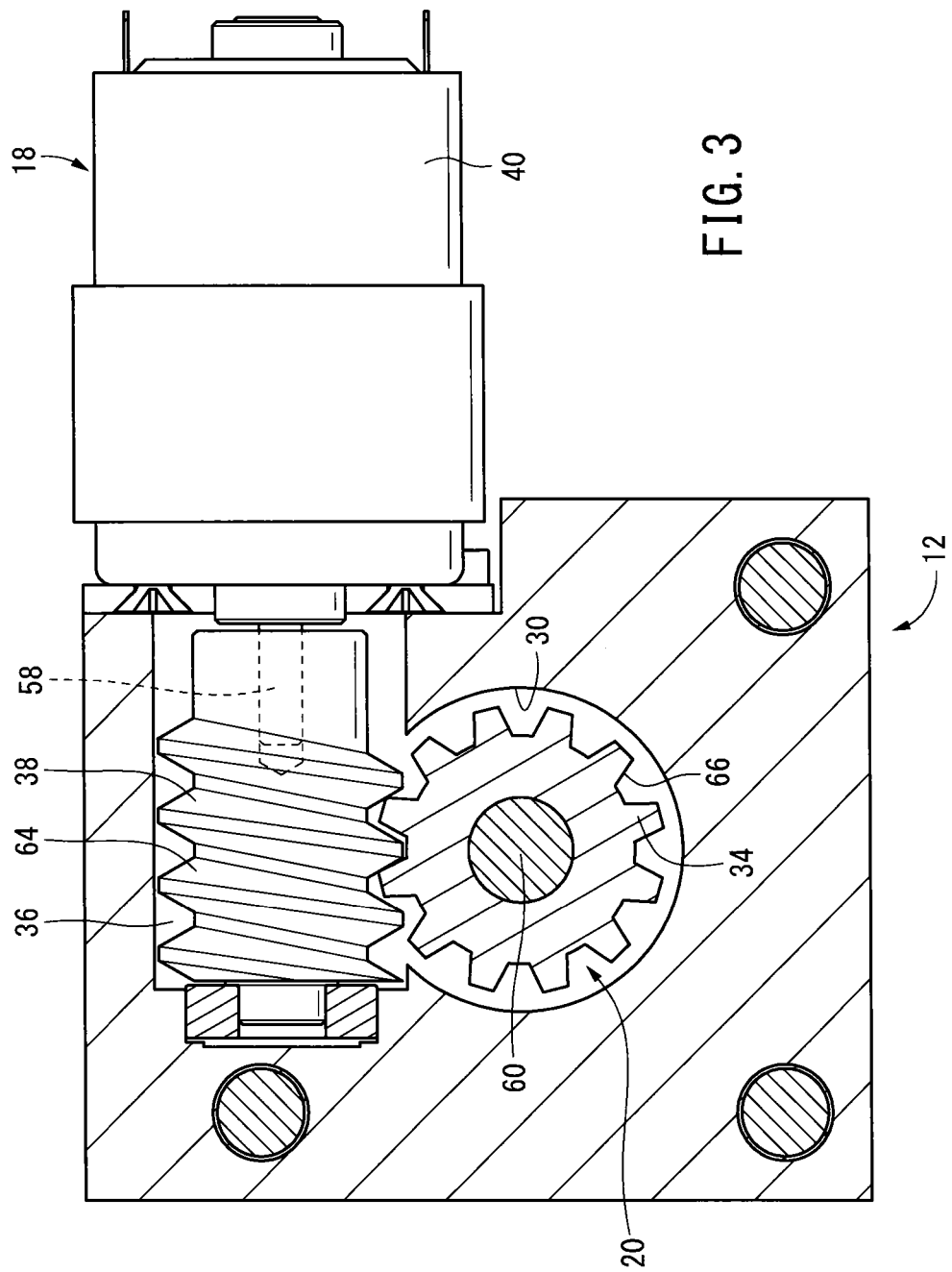
FIG. 3 is a cross sectional view taken along line III-III of FIG. 2.

Further, as shown in FIG. 3, a third accommodating hole 36 that opens laterally is formed in the body 12 adjacent to the first accommodating hole 30. A worm gear 38 that makes up part of the drive force transmission mechanism 20 is accommodated in the third accommodating hole 36. The third accommodating hole 36 communicates with the first accommodating hole 30 and extends in a substantially horizontal direction perpendicular to the axis of the first and second accommodating holes 30, 32. A rotary drive source 40 of the drive unit 18 is connected to an opening of the third accommodating hole 36.

As shown in FIGS. 1 and 2, the tube 14 is hollow, for example, and in the interior of the tube 14, a through hole 42 is formed, which is circular in cross section and penetrates through the tube 14 in the axial direction (the direction of arrows A and B). In addition, the piston 26 and first and second rods 44, 46 that constitute the drive force transmission mechanism 20 are disposed for displacement in the through hole 42. An upper part of the body 12 is connected to a lower end of the tube 14. The through hole 42 and the first and second accommodating holes 30, 32 are arranged coaxially. The end cover 16 is connected to an upper part of the tube 14 through a plurality of bolts 48 (see FIG. 1). Thus, opposite ends of the tube 14 are blocked respectively by the body 12 and the end cover 16.

The end cover 16 is constituted from a block body having a planar upper surface, and on a bottom part thereof, is formed with a fitting section 50 that is fitted into the through hole 42 of the tube 14. In a state in which the fitting section 50 is fitted into the through hole 42 on the upper end of the tube 14, plural bolts 48 are inserted from the upper surface side of the end cover 16, and the end cover 16 is connected to the tube 14 by threaded engagement of the bolts 48 respectively with the tube 14.

Further, a hole 52 that communicates with the through hole 42 penetrates in the axial direction (the direction of arrows A and B) through a substantially central portion of the end cover 16. The second rod 46 (described later) that makes up the drive force transmitting mechanism 20 is inserted displaceably through the hole 52 and is connected integrally, for example, by press-insertion or the like. An annular rod packing 54 is disposed through an annular groove on an inner circumferential surface of the hole 52, the rod packing 54 being disposed in sliding contact with the outer circumferential surface of the second rod 46.

Furthermore, a guide pin 56 that extends in a vertical direction (the direction of arrows A and B) is disposed on the end cover 16 at a position separated a predetermined distance from the hole 52. The guide pin 56 is screw-engaged with the end cover 16, and is formed substantially in parallel with the hole 52 projecting a predetermined height from the upper surface of the end cover 16.

The drive unit 18 is made up from the rotary drive source 40 such as a DC motor, a stepping motor, or the like, which is connected to a side surface of the body 12 in confronting relation to the third accommodating hole 36, and a drive shaft 58 thereof is inserted into the interior of the third accommodating hole 36. As the rotary drive source 40, for example, a brush-equipped DC motor is optimal.

In addition, the drive unit 18 is driven rotatably in a predetermined direction and for a predetermined rotational amount (angle) based on a control signal supplied from a non-illustrated controller or the like.

As shown in FIG. 3, the drive force transmitting mechanism 20 includes the worm gear 38, which is accommodated in the third accommodating hole 36 of the body 12 and is connected to the drive shaft 58 of the rotary drive source 40, the worm wheel 34, which is accommodated in the first accommodating hole 30 of the body 12 and is enmeshed with the worm gear 38, a shaft 60 connected to the center of the worm wheel 34, and a rotary nut (rotary body) 62 screw-engaged with the shaft 60.

The worm gear 38 is made up from a cylindrical body with helical threads 64 formed on the outer circumferential surface thereof. The drive shaft 58 of the rotary drive source 40 is connected to a central portion of the worm gear 38. Consequently, the worm gear 38 is rotated together with the drive shaft 58 under a driving action of the rotary drive source 40.

The worm wheel 34 is formed in a disk shape having plural gear teeth 66 along the outer circumferential surface thereof. The gear teeth 66 are enmeshed with the threads 64 of the worm gear 38.

As shown in FIG. 2, the shaft 60 is formed with a lengthwise dimension along the axial direction (the direction of arrows A and B) with helical threads being engraved on the outer circumferential surface thereof. Additionally, the shaft 60 is disposed in the interior of the first and second accommodating holes 30, 32 of the body 12 and in the through hole 42 of the tube 14. A lower end of the shaft 60 is supported rotatably via a bearing 68 in the interior of the first accommodating hole 30, and the worm gear 38 is connected to the shaft 60 alongside a region thereof that is supported by the bearing 68.

Further, the shaft 60 is inserted through the interior of the electromagnetic lock mechanism 28 provided in the second accommodating hole 32.

Figure 4:
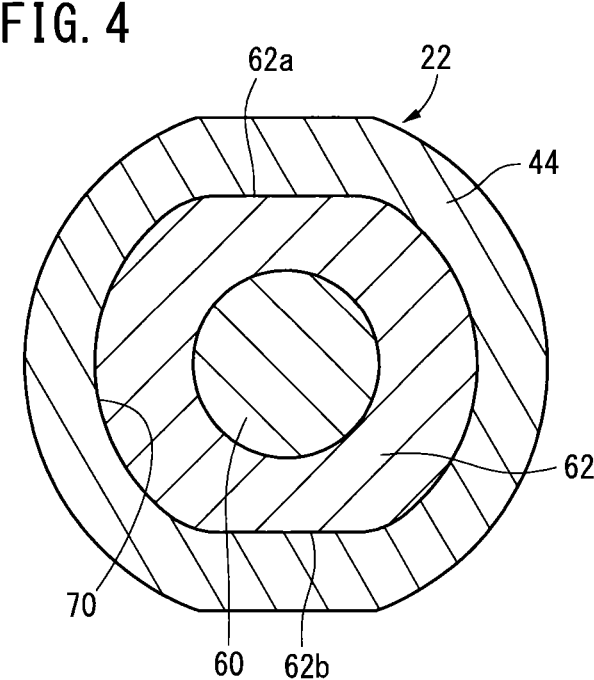
FIG. 4 is a cross sectional view taken along line IV-IV of FIG. 2.

On the other hand, an upper part from a substantially central portion along the axial direction (the direction of arrows A and B) of the shaft 60 is inserted through the interior of the first rod 44 of the piston mechanism 22 inside the through hole 42 of the tube 14, and a cylindrical rotary nut 62 is engaged with the threads provided on the outer circumferential side of the shaft 60. As shown in FIG. 4, the rotary nut 62 is formed with an oblong or oval shape in cross section having a pair of planar surface sections 62a, 62b.

By rotating the drive shaft 58 under a driving action of the drive unit 18, the worm gear 38 is rotated together with the drive shaft 58, whereby the worm wheel 34 enmeshed with the worm gear 38 is rotated at a reduced speed and rotation thereof is transferred to the shaft 60, which also rotates. Along therewith, the rotary nut 62 that is screw-engaged with the shaft 60 undergoes reciprocating movement in the axial direction (the direction of arrows A and B) of the shaft 60.

The piston mechanism 22 includes the first rod 44, which is disposed in the through hole 42 of the tube 14 and is provided on outer circumferential sides of the shaft 60 and the rotary nut 62, the piston 26 connected to the upper end of the first rod 44, and the second rod 46, which is connected to an upper part of the piston 26.

The first rod 44 is formed in a cylindrical shape having a predetermined length in the axial direction, with the shaft 60 and the rotary nut 62 being inserted in a rod hole 70 formed in the interior of the first rod 44. As shown in FIG. 4, the cross sectional shape of the rod hole 70 is formed with an oblong or oval shape in cross section corresponding to the cross sectional shape of the rotary nut 62. Therefore, the outer circumferential surface of the rotary nut 62, which is inserted through the rod hole 70, abuts against the rod hole 70, and rotational displacement of the rotary nut 62 in the rod hole 70 is prevented by the pair of planar surface sections 62a, 62b.

More specifically, by forming the rod hole 70 to have the same cross sectional shape as that of the rotary nut 62, the rod hole 70 functions as a rotation stop, which restricts rotation of the rotary nut 62, thereby causing the rotary nut 62 to be displaced only in the axial direction upon rotation of the shaft 60.

Further, as shown in FIG. 2, an attracting plate 72, which is formed, for example, in a disk shape from a metal material, is mounted on a lower end of the first rod 44. The attracting plate 72 is disposed to face toward the electromagnetic lock mechanism 28 provided in the body 12. A central portion of the attracting plate 72 is connected by being inserted into and screw-engaged with the interior of the first rod 44, and the attracting plate 72 is expanded in diameter in a radial outward direction perpendicular to the axial direction (the direction of arrows A and B) of the first rod 44.

The piston 26 is formed in a bottomed cylindrical shape. A piston packing 74 is installed via an annular groove on the outer circumferential surface of the piston 26, and in a central portion thereof, an upper end of the first rod 44 is screw-engaged and connected to the piston 26. In addition, the piston 26 is displaceable in the axial direction in a state of sliding contact via the piston packing 74 with the through hole 42 of the tube 14.

Further, on the upper surface of the piston 26, an annular buffering member 76 is installed thereon, which buffers shocks when the piston 26 is displaced upwardly (in the direction of the arrow B) and abuts against the end cover 16.

Moreover, a spring 80 is interposed between a receiving flange 78 disposed in the second accommodating hole 32 of the body 12 and the piston 26. The spring 80 is constituted from a coil spring, for example, and is arranged on the outer circumferential side of the shaft 60, so as to urge the piston 26 in a direction away from the body 12 (in the direction of the arrow B). Stated otherwise, the spring 80 functions as a biasing member for urging the piston mechanism 22 including the piston 26 to separate away from the body 12.

The second rod 46 is arranged upwardly of the piston 26 (in the direction of the arrow B), and the lower end of the second rod 46 is connected to an upper central part of the piston 26 by screw-engagement therewith. The second rod 46 is inserted displaceably in the hole 52 of the end cover 16, and the stopper lever 24 is connected to the upper end of the second rod 46.

More specifically, the first and second rods 44, 46 and the piston 26 that make up the piston mechanism 22 are disposed for reciprocal displacement integrally in the axial direction (the direction of arrows A and B) in the through hole 42 of the tube 14.

The electromagnetic lock mechanism 28 includes an electromagnetic coil 82 disposed in the second accommodating hole 32 of the body 12 and which is excited upon being supplied with power from a non-illustrated controller, a holder 84 that holds the electromagnetic coil 82, and an attracting body 86 that is disposed in the opening of the second accommodating hole 32.

The electromagnetic coil 82 is arranged in an annular shape in the interior of the holder 84, and generates a magnetic force when excited upon supply of electric power thereto.

By being arranged on the upper part of the holder 84 alongside the electromagnetic coil 82, the attracting body 86 formed from a metal material is disposed to confront the attracting plate 72 that is connected to the lower end of the first rod 44. In addition, when the electromagnetic coil 82 is excited and generates a magnetic force, the magnetic force is transmitted to the attracting body 86, and in the case that the attracting plate 72 is positioned in close proximity to the attracting body 86, the attracting plate 72 is attracted by the magnetic force. Consequently, the first rod 44, which is connected to the attracting plate 72, is retained (locked) by the electromagnetic lock mechanism 28, whereby displacement of the first rod 44, the piston 26, and the second rod 46 in the axial direction (the direction of arrows A and B) is restricted.

Stated otherwise, the electromagnetic lock mechanism 28 functions as a locking member, which through use of electricity, is capable of restricting displacement of the piston 26 and the first and second rods 44, 46 in the axial direction.

The stopper lever 24 includes a base member 88 connected to the upper end of the second rod 46, a pair of support members 90a, 90b that project upwardly with respect to the base member 88, and a lever 92, which is supported rotatably with respect to the support members 90a, 90b.

The base member 88 is disposed upwardly of the end cover 16 (in the direction of the arrow B) and is arranged roughly in parallel with the end cover 16. A semicircular guide groove 94 is recessed in one end of the base member 88, and the guide pin 56 provided on the end cover 16 is inserted into the guide groove 94. More specifically, when the stopper lever 24 including the base member 88 moves in an axial (vertical) direction, as a result of being guided along the guide pin 56 that is inserted into the guide groove 94, the base member 88 can be moved stably in the axial direction.

The support members 90a, 90b are erected in an upstanding manner on the base member 88 and are separated mutually by a predetermined distance with the lever 92 being disposed therebetween. A support pin 96 spans between the two support members 90a and 90b, and the lever 92 is disposed rotatably between the support members 90a, 90b via the support pin 96.

The lever 92 is substantially triangular in cross section, the angle formed roughly in the center thereof being supported by the support members 90a, 90b via the support pin 96. A pair of rollers 98 is supported rotatably on one end side with respect to the aforementioned angle. The other end of the lever 92 abuts against a damper pin 100, which projects from the upper surface of the base member 88, the lever 92 being urged in a counterclockwise direction (the direction of the arrow C) by the damper pin 100.

Further, for example, when a workpiece W abuts against the lever 92 and the lever 92 is pressed and rotates in a clockwise direction (the direction of the arrow D), the lever 92 is rotated clockwise by a predetermined angle about the support pin 96 while pressing down on the damper pin 100.

More specifically, the lever 92 is retained in a condition of being rotated counterclockwise about the support pin 96 under an urging action of the damper pin 100, such that when an end side thereof is pressed, for example, by a workpiece W or the like, the lever 92 is rotated clockwise in opposition to the biasing force of the damper pin 100.

Figure 5:
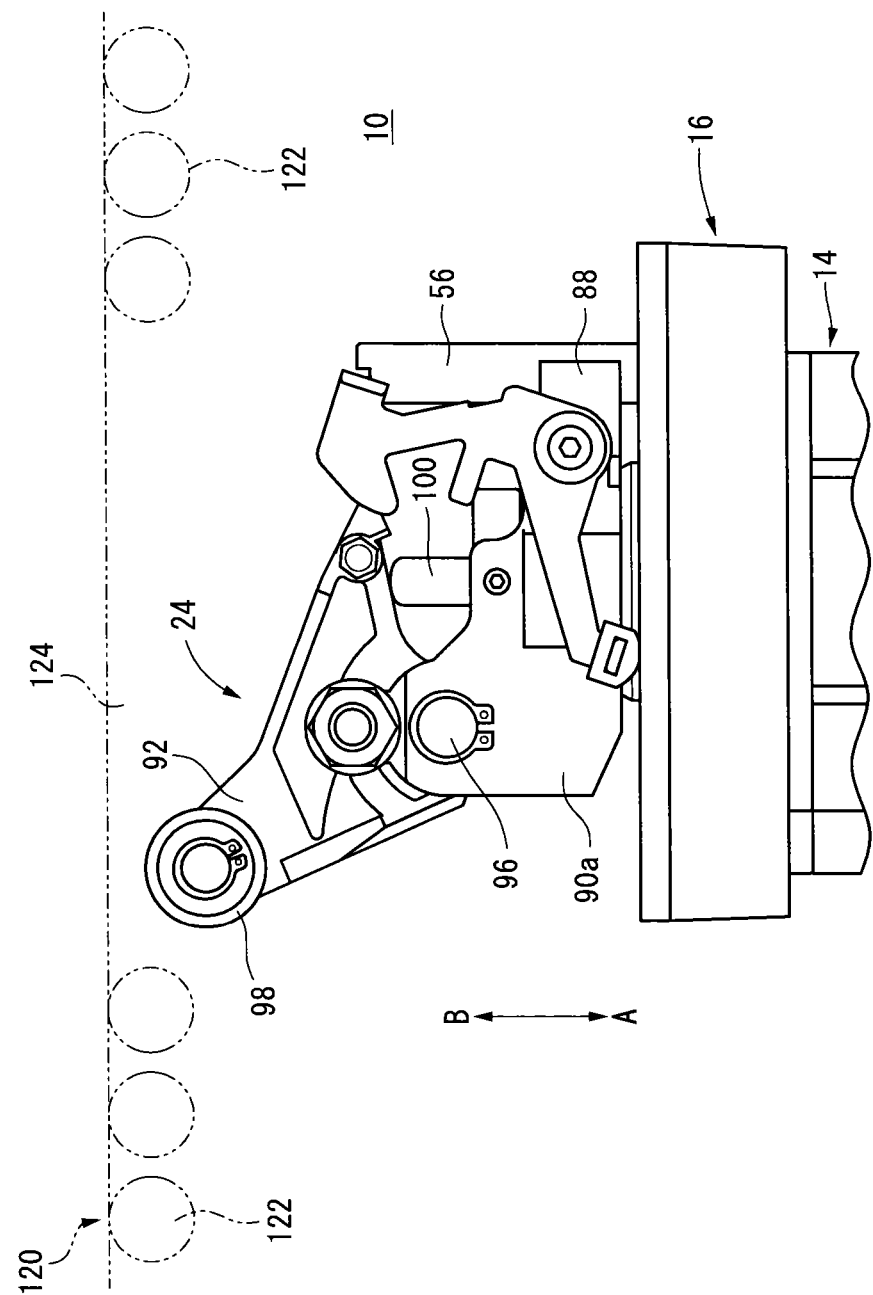
FIG. 5 is an enlarged side view showing the vicinity of a stopper lever in the stopper cylinder of FIG. 2.

The stopper cylinder 10 according to the embodiment of the present invention is basically constructed as described above. Next, operations and advantages of the stopper cylinder 10 will be explained. As shown in FIG. 5, an initial condition is defined as a condition in which the stopper cylinder 10 is arranged such that the rollers 98 thereof are positioned in a gap 124 formed between adjacent roller conveyors 122, from among the plural roller conveyors 122 that make up a conveyor line 120. In the initial position, the stopper lever 24 of the stopper cylinder 10 is positioned downwardly (in the direction of the arrow A) with respect to the conveyor line 120, and referring to FIG. 2, the rotary nut 62 is arranged on the side of the body 12 (in the direction of the arrow A), and the attracting plate 72 also is arranged on the side of the body 12 (in the direction of the arrow A).

At first, in the initial condition shown in FIG. 2, the electromagnetic coil 82 of the electromagnetic lock mechanism 28 is energized electrically from a non-illustrated controller, and in accordance with the generated magnetic force, the attracting plate 72 is attracted to the attracting body 86. More specifically, the first and second rods 44, 46 and the piston 26 that make up the piston mechanism 22 are retained (locked) by the electromagnetic lock mechanism 28 in a downward or descended condition within the through hole 42 of the tube 14. On the other hand, at this time, the rotary drive source 40 of the drive unit 18 is in a non-energized state, in which electric power is not supplied thereto from the non-illustrated controller.

Figure 6:
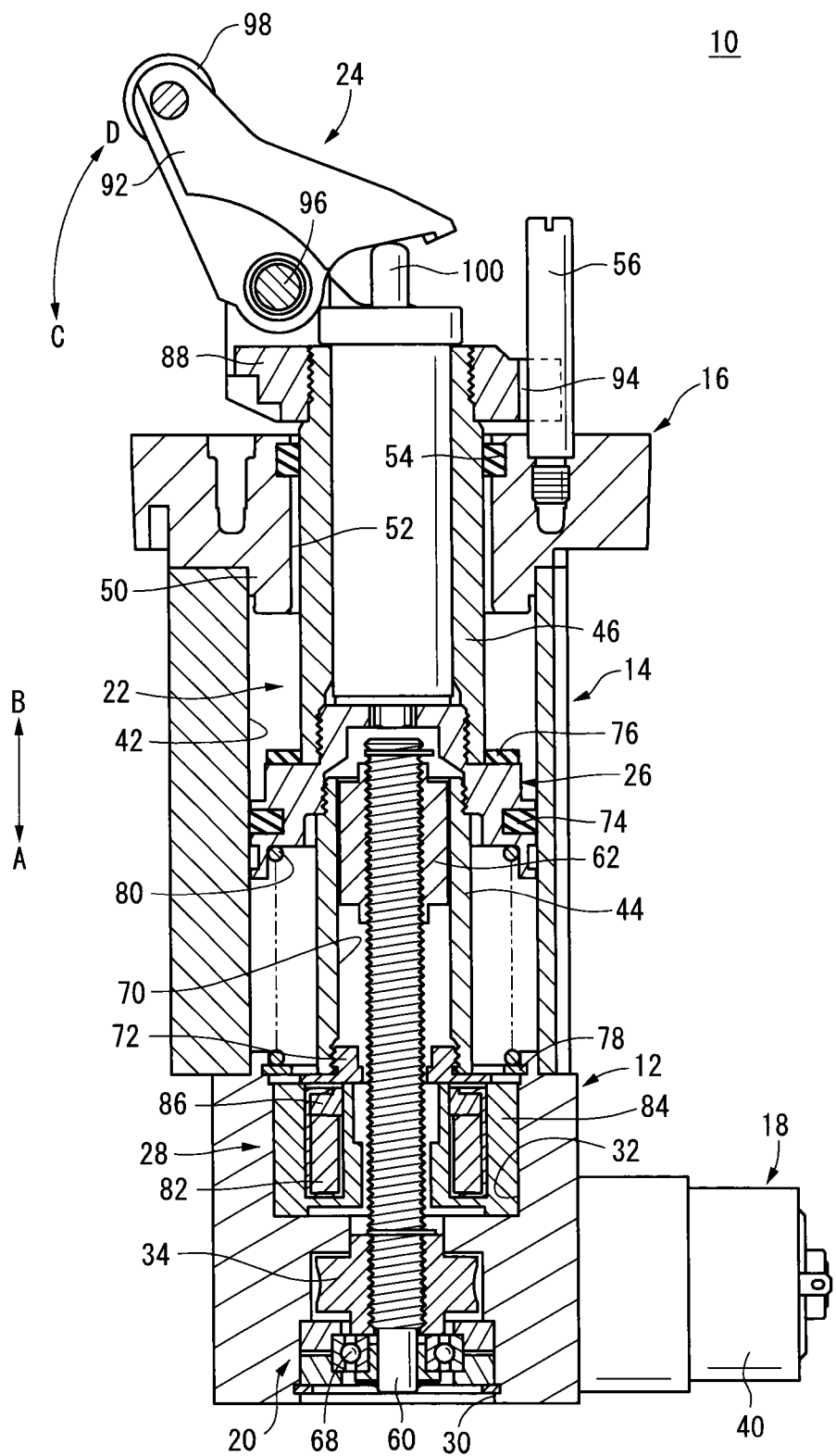
FIG. 6 is an overall cross sectional view showing a condition in the stopper cylinder of FIG. 2 in which a rotary nut is raised by a driving action of a drive unit.

Next, based on a control signal from the non-illustrated controller, the rotary drive source 40 of the drive unit 18 is rotated by a predetermined rotational amount (angle), whereby the drive shaft 58 and the worm gear 38 are rotated, accompanied by the shaft 60 and the worm wheel 34, which is enmeshed with the worm gear 38, being rotated together therewith. As a result, as shown in FIG. 6, the rotary nut 62 is displaced upwardly (in the direction of the arrow B) in the interior of the first rod 44 under the rotary action of the shaft 60, whereby the rotary nut 62 is displaced to a location in the vicinity of the upper end of the shaft 60. At this time, since the rotary nut 62 is kept in engagement with the rod hole 70 of the first rod 44, relative rotational displacement of the rotary nut 62 with respect to the first rod 44 is restricted, and the rotary nut 62 is displaced only in the axial direction (the direction of the arrow B).

Further, as shown in FIG. 6, even in the event that the rotary nut 62 is raised from a substantially central portion of the shaft 60, the first rod 44, which is connected to the attracting plate 72, is firmly attracted to and retained (locked) by the electromagnetic coil 82. Owing thereto, the piston 26 and the first and second rods 44, 46 are not displaced upwardly (in the direction of the arrow B) by the elastic force of the spring 80. More specifically, the stopper lever 24 is not allowed to project upwardly with respect to the roller conveyors 122 of the conveyor line 120.

Figure 7:
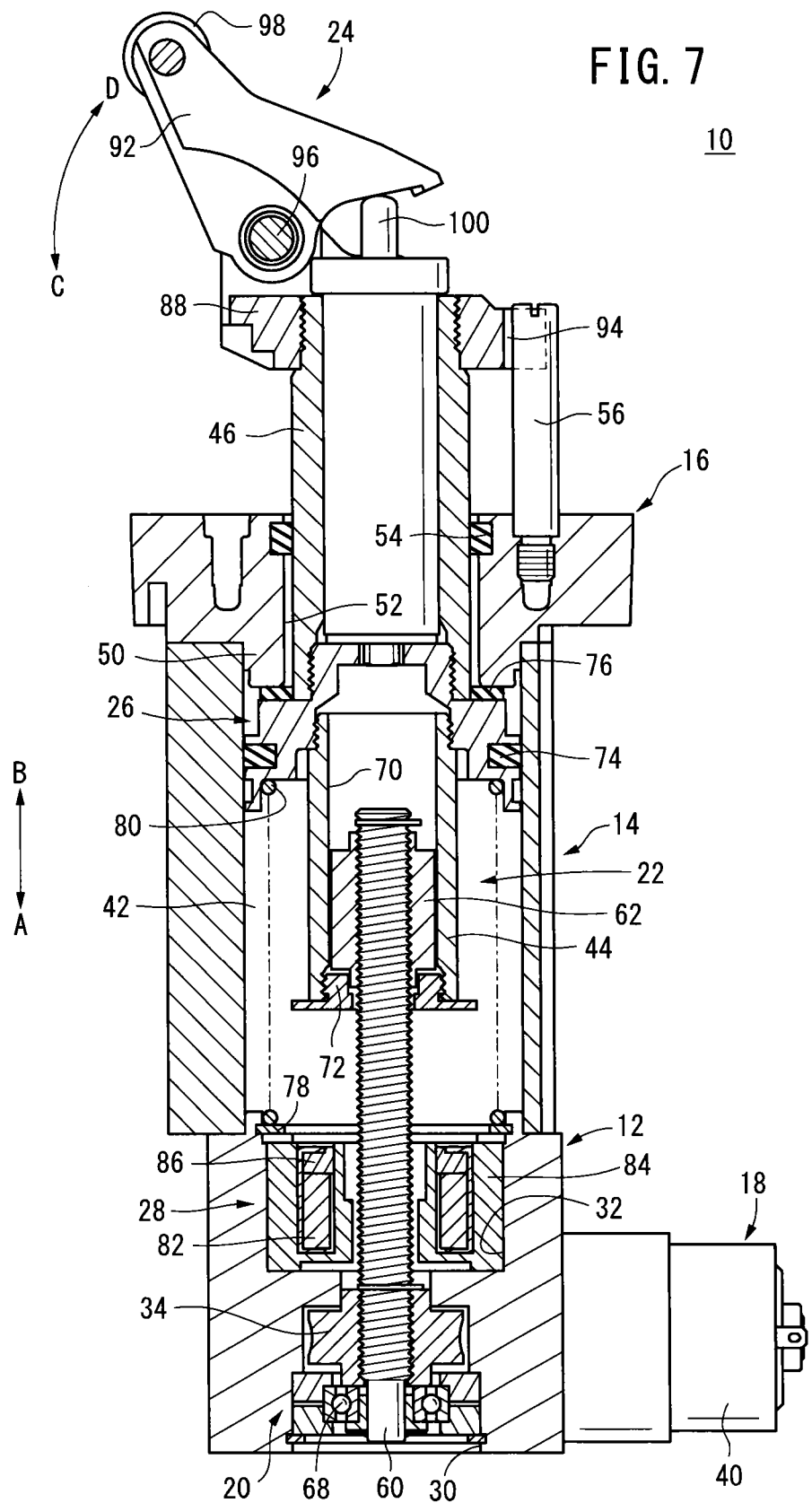
FIG. 7 is an overall cross sectional view showing a condition in which a retained state of a piston mechanism by an electromagnetic lock mechanism is released.
Figure 8:
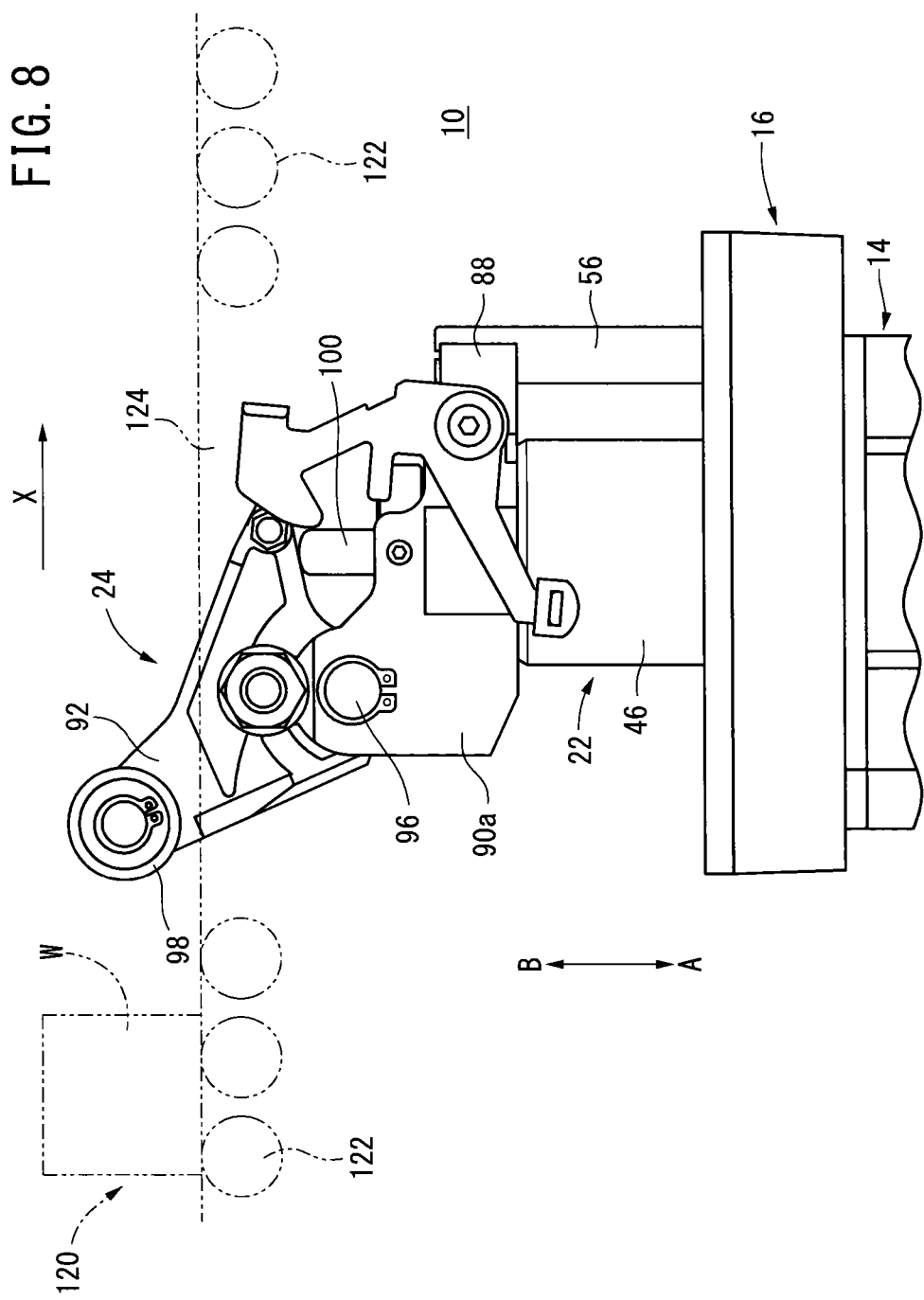
FIG. 8 is an enlarged side view showing the vicinity of the stopper lever in the stopper cylinder of FIG. 7.
Figure 9:
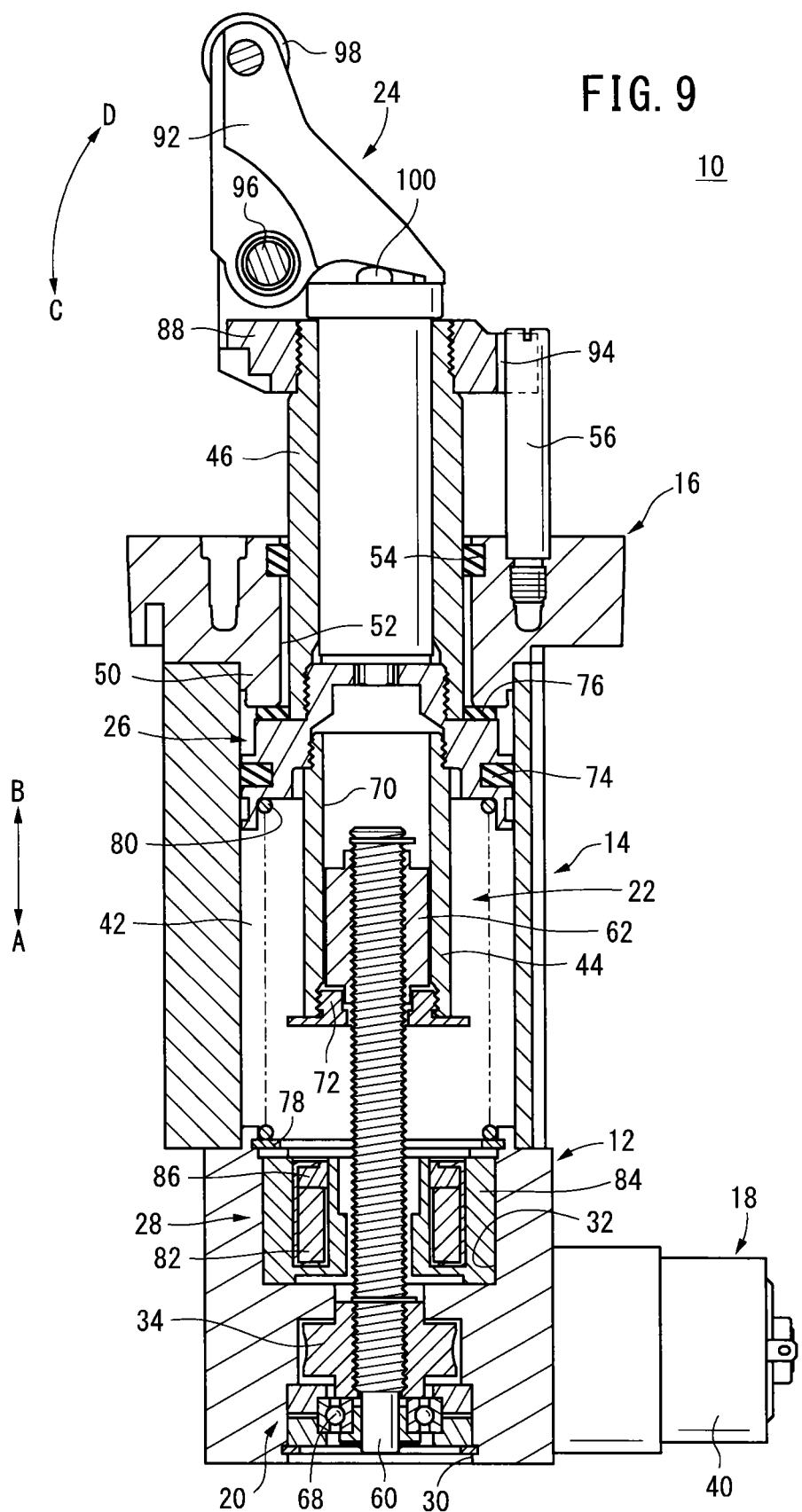
FIG. 9 is an overall cross sectional view showing a state in the stopper cylinder of FIG. 7, in which the stopper lever is rotated through a predetermined angle by abutment with a workpiece.

Next, as shown in FIG. 8, after it is detected that a workpiece W, which is transported along the conveyor line 120 and represents an object to be stopped, has come into close proximity to an area (gap 124) where the stopper cylinder 10 is arranged, a non-energized state is brought about in which supply of power from the non-illustrated controller to the electromagnetic coil 82 is stopped. In addition, the magnetic force from the electromagnetic coil 82 is reduced in energy, whereby the attractive force (holding force) with respect to the attracting plate 72 is released. As a result, as shown in FIG. 7, by the electromagnetic lock mechanism 28 releasing the displacement restricted condition (locked state) of the piston mechanism 22 in the axial direction, the piston 26 is urged upwardly (in the direction of the arrow B) by the elastic force of the spring 80, whereby the piston 26 and the first and second rods 44, 46 are raised together integrally along the through hole 42 of the tube 14. In this case, a non-energized state is brought about in which energization of the drive unit 18 also is suspended.

As a result, as shown in FIG. 8, the stopper lever 24 is raised together with the piston mechanism 22, and a standby state is brought about in which the stopper lever 24 projects upwardly by a predetermined height from the gap 124 between the adjacent rollers 98.

Lastly, as shown in FIG. 10, the workpiece W, which has moved (in the direction of the arrow X) to the side of the stopper cylinder 10 along the conveyor line 120, comes into abutment against the roller 98 provided on the distal end of the lever 92, whereby the lever 92 is rotated clockwise (in the direction of the arrow D) by a predetermined angle about the support pin 96 while the damper pin 100 is pressed toward the side of the tube 14 (in the direction of the arrow A). Consequently, shocks caused when the workpiece W comes into contact with respect to the lever 92 are suitably absorbed by the damper pin 100, and a locked condition of the workpiece W is brought about in which the lever 92 is substantially perpendicular to the direction of conveyance (the direction of the arrow X).

In this manner, on the conveyor line 120, pushing back on the workpiece W in a direction opposite to the direction of conveyance (the direction of the arrow X) is prevented, and the workpiece W can be stopped smoothly at a predetermined position.

On the other hand, in the event that the stopped condition of the workpiece W on the conveyor line 120 is released, the rotary drive source 40 of the drive unit 18 is rotated in an opposite direction by a drive signal supplied from the non-illustrated controller. Thus, the worm gear 38, the worm wheel 34, and the shaft 60 that make up the drive force transmission mechanism 20 are rotated, accompanied by the rotary nut 62 being displaced in a downward direction (the direction of the arrow A) along the shaft 60.

In addition, by descending movement of the rotary nut 62, the attracting plate 72, which abuts against the lower end of the rotary nut 62, is pressed downwardly, and the second rod 46, the piston 26 and the first rod 44 are pulled downward integrally (in the direction of the arrow A). Consequently, the piston 26 descends while gradually compressing the spring 80 in opposition to the elastic force of the spring 80, and when the attracting plate 72 abuts against the upper part of the electromagnetic lock mechanism 28, a magnetic force is generated by energizing the electromagnetic coil 82 of the electromagnetic lock mechanism 28, whereby the attracting plate 72 is attracted and held by the magnetic force of the electromagnetic coil 82.

Owing thereto, as shown in FIG. 2, in a condition in which the piston mechanism 22 is lowered to compress the spring 80, the piston mechanism 22 is retained in this state by the electromagnetic lock mechanism 28, and the initial condition in which the rotary nut 62 is lowered is restored.

In the foregoing manner, according to the present embodiment, the piston mechanism 22, which is connected to the stopper lever 24, is disposed displaceably in the interior of the tube 14, and the spring 80, which biases the piston mechanism 22 upwardly (in the direction of the arrow B), is disposed between the body 12 and the piston 26 of the piston mechanism 22. Further, by energizing the electromagnetic lock mechanism 28 disposed in the body 12, displacement of the second rod 46 constituting the piston mechanism 22 in the axial direction (the direction of arrows A and B) can be restricted.

As a result, from a condition in which the piston mechanism 22 is lowered inside the tube 14 and is retained (locked) by the electromagnetic lock mechanism 28, by suspending power to the electromagnetic lock mechanism 28 and releasing the locked condition, the piston mechanism 22 and the stopper lever 24 can be raised reliably by the elastic force of the spring 80. Further, by appropriately setting the length of the piston 26 and the elastic force of the spring 80, etc., the displacement amount of the piston mechanism 22 along the axial direction can be set to a desired amount of displacement.

Further, since restriction of displacement in the axial direction (the direction of arrows A and B) of the stopper lever 24 can be performed electrically by means of the electromagnetic lock mechanism 28, the displacement restricted state can reliably and easily be released simply by switching between energized and non-energized states of the electromagnetic lock mechanism 28.

Furthermore, when the stopper lever 24 is displaced in the axial direction (the direction of arrows A and B), since movement of the stopper lever 24 is brought about using the elastic force of the spring 80, in the case that the locked state of the electromagnetic lock mechanism 28 is released for reasons such as a power failure or the like, the stopper lever 24 can be raised reliably by the elastic force and conveyance of the workpiece W can be stopped. More specifically, the stopper cylinder 10 is a single-acting structure capable of displacing the piston mechanism 22 and the stopper lever 24 solely by the elastic force of the spring 80, and can provide a simpler structure compared to a double-acting structure.

Still further, in the case that the initial condition is restored, in which the piston mechanism 22 is lowered and the stopper lever 24 is pulled inwardly with respect to the conveyor line 120, by pulling the second rod 46 downwardly (in the direction of the arrow A) using the rotary nut 62 under a driving action of the drive unit 18, the piston 26 can be moved downward while compressing the spring 80. More specifically, the drive unit 18 and the drive force transmission mechanism 20 are provided with the aim of restoring the piston mechanism 22 to the initial position in opposition to the elastic force of the spring 80.

Still further, in the case that power is suspended while the rotary nut 62 is in the process of moving upward or downward along the shaft 60, current is supplied from an emergency power source (e.g., a battery) through the non-illustrated controller, whereby a control is carried out so that the rotary nut 62 is moved to the upper end of the shaft 60. Owing thereto, for example, even in the case that the rotary nut 62 is stopped at an intermediate location on the shaft 60 due to suspension of power due to a power failure or the like, the rotary nut 62 can be moved to the upper end of the shaft 60. As a result, by the elastic force of the spring 80, the second rod 46 can be made to move a predetermined distance in the axial direction, whereby the stopper lever 24 projects a predetermined height with respect to the conveyor line 120, so that the workpiece W can reliably be stopped.

Further, by adopting the worm gear 38, the worm wheel 34, etc., as the drive force transmitting mechanism 20, the drive force from the drive unit 18 can be reduced in speed and reliably transmitted, along with enabling a reduction in the axial dimension of the stopper cylinder 10.

Furthermore, the present invention is not limited to a case in which the stopper cylinder 10 is disposed on the aforementioned conveyor line 120 and movement of a workpiece W is stopped. For example, the lever 92 of the stopper lever 24 may be used with an opening/closing device connected to a door, a valve, or the like, or may be used with a clamp apparatus that grips a workpiece by clamping the same. In the case of being used as an opening/closing device, since a closed state of a door or a valve can be brought about at times that power is suspended or cut off, in the case of a door, crime or disaster prevention measures can be carried out, and in the case of a valve, outward flow or leakage of an internal fluid can be prevented, advantageously.

Further, in the case that the stopper cylinder 10 is used in a clamp apparatus, in the event that power is suspended, by automatically bringing about a clamped condition in which a lever presses against a workpiece, dropping of the workpiece can be prevented.

The stopper cylinder according to the present invention is not limited to the aforementioned embodiment, and it is a matter of course that various additional or modified structures may be adopted therein without deviating from the essential gist of the present invention.

What is claimed is:

1. A stopper cylinder for stopping a workpiece at a predetermined position by bringing the workpiece, which is transported in a predetermined direction, into abutment against a roller, and by maintaining a lever on which the roller is axially supported at a predetermined position, comprising:
    a body;
    a piston mechanism provided in an interior of the body and disposed for displacement along an axial direction of the body;
    the lever disposed rotatably on an end of the piston mechanism;
    a biasing member for urging the piston mechanism in the axial direction; and
    a lock mechanism disposed on the body, which restricts displacement of the piston mechanism along the axial direction upon supply of electric power to the lock mechanism,
    wherein, upon suspension of electric power to the lock mechanism, a displacement restricted state of the piston mechanism by the lock mechanism is released, whereby the piston mechanism is displaced a predetermined direction along the axial direction under an urging action of the biasing member.

2. The stopper cylinder according to claim 1, further comprising:
    a drive unit disposed in the body and having a rotary drive source driven by supply of electric power to the rotary drive source; and
    a drive force transmission mechanism disposed in the body and having a shaft rotated under a driving action of the drive unit, and a rotary body which is screw-engaged and displaceable in the axial direction with respect to the shaft,
    wherein by displacement of the rotary body along the axial direction, the piston mechanism, which has been displaced in the predetermined direction under the urging action of the biasing member, is restored to a condition before displacement thereof in opposition to a biasing force of the biasing member.

3. The stopper cylinder according to claim 1, wherein the biasing member comprises a spring coiled in a helical shape along the axial direction.

4. The stopper cylinder according to claim 1, wherein the lock mechanism comprises an electromagnetic coil having a coil excited by supply of electric power, the piston mechanism being attracted by a magnetic force generated upon excitation of the electromagnetic coil, for thereby restricting displacement of the piston mechanism in the axial direction.

5. The stopper cylinder according to claim 2, wherein the rotary body comprises a rotation restricting member inserted through an interior of a rod constituting the piston mechanism and which restricts rotational displacement of the rotary body with respect to the rod.

6. The stopper cylinder according to claim 1, the piston mechanism further comprising:
    a first rod disposed in confronting relation to the lock mechanism;
    a piston connected to an end of the first rod and which is displaced while in sliding contact along the body; and
    a second rod, one end of which is connected to the piston, and the lever being disposed on another end thereof,
    wherein the biasing member is disposed between the piston and the lock mechanism.

7. The stopper cylinder according to claim 4, further comprising an attracting plate made of a metal material, which is disposed on an end of the piston mechanism facing the lock mechanism and is attracted by the magnetic force.

8. The stopper cylinder according to claim 1, wherein the displacement direction is perpendicular to a direction in which the workpiece is transported, and is a direction toward a side of the workpiece.

9. The stopper cylinder according to claim 6, wherein a base member that supports the lever is disposed on an end of the second rod, and the body further comprises a guide member for guiding the base member and the second rod in the axial direction.

\* \* \* \* \*